United States Patent [19]
Dauwalter

[11] Patent Number: 5,959,382
[45] Date of Patent: *Sep. 28, 1999

[54] MAGNETIC ACTUATOR AND POSITION CONTROL SYSTEM

[75] Inventor: Charles R. Dauwalter, New Highlands, Mass.

[73] Assignee: Milli Sensor Systems and Actuators, Inc., West Newton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/730,712

[22] Filed: Oct. 15, 1996

Related U.S. Application Data

[60] Provisional application No. 60/005,424, Oct. 13, 1995.

[51] Int. Cl.[6] ............................. H02K 33/00; F16C 39/06
[52] U.S. Cl. ..................... 310/90.5; 310/266; 310/268; 310/12
[58] Field of Search ............................ 310/12, 268, 266, 310/269, 166, 14, 49 R, 90.5

[56] References Cited

U.S. PATENT DOCUMENTS

| | | | |
|---|---|---|---|
| 3,223,867 | 12/1965 | Shapiro | 310/268 |
| 3,225,235 | 12/1965 | Lee | 310/268 |
| 3,355,914 | 12/1967 | Venema et al. | 310/268 |
| 3,735,231 | 5/1973 | Sawyer | 310/12 |
| 4,081,726 | 3/1978 | Brimer et al. | 310/268 |
| 4,288,709 | 9/1981 | Matthias et al. | 310/49 R |
| 4,315,171 | 2/1982 | Schaeffer | 310/49 R |
| 4,316,394 | 2/1982 | Dohogne | 74/5.46 |
| 4,353,602 | 10/1982 | Haberman | 308/10 |
| 4,483,570 | 11/1984 | Inoue | 310/90.5 |
| 4,514,674 | 4/1985 | Hollis et al. | 318/687 |
| 4,677,327 | 6/1987 | Kushida et al. | 310/43 |
| 4,683,391 | 7/1987 | Higuchi | 310/90.5 |
| 4,737,753 | 4/1988 | Oudet | 335/284 |
| 4,761,574 | 8/1988 | Nakagawa | 310/12 |
| 4,794,286 | 12/1988 | Taenzer | 310/12 |
| 4,857,782 | 8/1989 | Tokio et al. | 310/12 |
| 4,922,145 | 5/1990 | Shitpelman | 310/49 |
| 5,160,877 | 11/1992 | Fujiwava et al. | 310/90.5 |
| 5,198,711 | 3/1993 | Eckersley | 310/12 |
| 5,216,308 | 6/1993 | Meeks | 310/90.5 |
| 5,237,229 | 8/1993 | Ohishi | 310/90.5 |
| 5,334,894 | 8/1994 | Nakagawa | 310/49 R |
| 5,396,140 | 3/1995 | Goldie et al. | 310/268 |

FOREIGN PATENT DOCUMENTS

| 22600232 | 3/1975 | France | 310/90.5 |
|---|---|---|---|

OTHER PUBLICATIONS

"A Fully Integrated Magnetically Acuated Micromachined Relay", pp. 231–234 of the Jun. 1996, Proceedings of the 1996 Solid State Sensor and Actuator Workshop, by William P. Taylor, Mark G. Allen and Charles R. Dauwalter.

*Primary Examiner*—Nestor Ramirez
*Assistant Examiner*—Burton S. Mullins
*Attorney, Agent, or Firm*—Brian M. Dingman

[57] ABSTRACT

A magnetic actuator for accomplishing relative movement between an excited actuator member and a passive actuator member, comprising: a magnetic excited actuator member configured to define along its active surface a series of external teeth separated by slots, with a back iron area behind the teeth and slots to complete the flux paths within the excited member, with actuating electrical conductors disposed within the slots to accomplish a distributed conductor electric coil arranged such that the current flows in opposite directions in the conductors in each adjacent slot, to create oppositely-directed flux paths that additively combine in the tooth between the adjacent slots to accomplish a high level of magnetic force with a lower back iron thickness; and a magnetic passive member proximate, and spaced from, the excited member active surface, the passive member completing the flux paths; whereby the position of the passive member relative to the excited member can be controlled through control of the current flow in the distributed conductors of the excited member electric coil.

16 Claims, 8 Drawing Sheets

MAGNETIC ACTUATOR AND POSITION CONTROL SYSTEM

RELATED APPLICATION

This application is a continuation-in-part of application number 60/005,424, filed on Oct. 13, 1995.

FIELD OF THE INVENTION

This invention relates to a magnetic actuator that accomplishes and controls the relative movement between a passive and an active member.

BACKGROUND OF THE INVENTION

Actuators are used for a variety of purposes. Relays are a common example. Typically, actuators include an excited member and a passive member. The excited member normally acts upon the passive member to move, and sometimes control the position of, the passive member. In the case of a relay, a movable member (commonly the passive member) is moved relative to the fixed member, which is commonly the excited member. Electromagnetic relays operate by pulling the passive member toward the excited member using electromagnetic energy. The passive member is usually returned with a mechanical urging force, such as accomplished with a spring.

There are also myriad situations in which actuators are used to control the relative positions of the actuator members in a number of degrees of freedom. Magnetic bearings, and inertial instruments such as gyroscopes and accelerometers, are examples. In such cases, the position of a spinning shaft or wheel must be precisely controlled. Control movement of the shaft or wheel is accomplished through electromagnetic, or a combination of magnetic and electromagnetic, energy, typically provided by the stator.

One goal of actuator development is miniaturization. In inertial instruments, a smaller and lighter rotor requires less force to suspend and control its position. This reduces the power required to operate the device. Another goal is to increase the developed force relative to the rotor mass, which allows the device to withstand higher acceleration forces. In relays, such higher force relative to armature (passive member) mass leads to greater actuation rates.

SUMMARY OF THE INVENTION

It is therefore an object of this invention to provide a small, lightweight magnetic actuator.

It is a further object of this invention to provide such a magnetic actuator which can be fabricated by milli/micro planar fabrication technologies to achieve small size, and allow batch fabrication, thus reducing the fabrication cost.

It is a further object of this invention to provide such a magnetic actuator which can withstand large acceleration forces.

It is a further object of this invention to provide such a magnetic actuator which can be used to control the position of electronic devices such as disk read/write heads of data storage devices.

This invention features a magnetic actuator for accomplishing relative movement between an excited actuator member and a passive actuator member, comprising: a magnetic excited actuator member configured to define along its active surface a series of external teeth separated by slots, with a back iron area behind the teeth and slots to complete the flux paths within the excited member, with actuating electrical conductors disposed within the slots to accomplish a distributed conductor electric coil arranged such that the current flows in opposite directions in the conductors in each adjacent slot, to create oppositely-directed flux paths that additively combine in the tooth between the adjacent slots to accomplish a high level of magnetic force with a lower back iron thickness; and a magnetic passive member proximate, and spaced from, the excited member active surface, the passive member completing the flux paths; whereby the position of the passive member relative to the excited member can be controlled through control of the current flow in the distributed conductors of the excited member electric coil.

The passive member may have a control surface, facing the excited member, and configured to define a series of external teeth separated by slots, to allow development of both normal and tangential electromagnetic control forces between the excited and passive members. The tooth pitch in the members is identical. One of the excited and the passive members may be configured as a rotating rotor member, and the other as a stator, to accomplish magnetic suspension and control of the rotor member. The passive member may be a rotating wheel with opposite faces, and the excited member may be a stator distributed opposite at least one face of the rotating wheel. The stator may be distributed opposite both faces of the rotating wheel. The stator may be arranged to accomplish control of the position of the rotating wheel, relative to the stator, in five degrees of freedom. The stator may include a plurality of separate stator sectors opposite each face of the rotating wheel, each sector including its own distributed-conductor electric coil, for control of the normal, tangential and rotational position (except for rotation about the spin axis) of the rotor relative to the stator. The stator may include eight stator quadrants, four opposite each face of the rotating wheel, each being identical. The stator slots may be spaced, arc-shaped concentric slots extending between the radii defining edges of the quadrants. The distributed conductor electric coil may then include a continuous conductor running through each of the stator slots, and partially along each radius defining the stator sector.

Also featured is a position control system for a magnetically suspended rotor adapted to rotate about a rotation axis, comprising: a plurality of separate position control stator sectors opposite and spaced from the rotor, each stator sector having external slots facing the rotor to define a series of external teeth separated by slots; a distributed-conductor electric coil for each of the stator sectors, each coil including at least one conductor in each slot of the respective stator sector; and means for separately energizing each electric coil to control the position of the rotor relative to the stator.

The rotor may be a wheel with essentially flat faces, and the stator sectors are then arranged proximate each face of the rotor. The stator sectors proximate each face of the rotor may define a circular stator portion, and each sector of each stator portion may be a quadrant defined by two radii of the stator portion, and the stator portion circumference. The slots may be concentric spaced arc-shaped slots extending between the two radii which partially define the stator portion. The electric coil for each stator portion may include a continuous conductor running through each of the concentric slots, and partially along each radius.

BRIEF DESCRIPTION OF THE DRAWINGS

Other objects, features and advantages will occur to those skilled in the art from the following description of the preferred embodiments, and the accompanying drawings, in which.

DESCRIPTION OF THE PREFERRED EMBODIMENTS

This invention features a magnetic actuator that accomplishes relative movement between the actuator members using magnetic and/or electromagnetic energy. The invention also accomplishes position control between the members of an actuator.

The embodiments described in detail below are exemplary of this invention, but are not meant to limit the invention in any manner. The preferred embodiments are described relative to a magnetic actuator having a rotor and a stator. For such case, the rotor is described as a flat-faced wheel, however, the invention is applicable to the movement and control of rotating members of other shapes.

Figure 1:
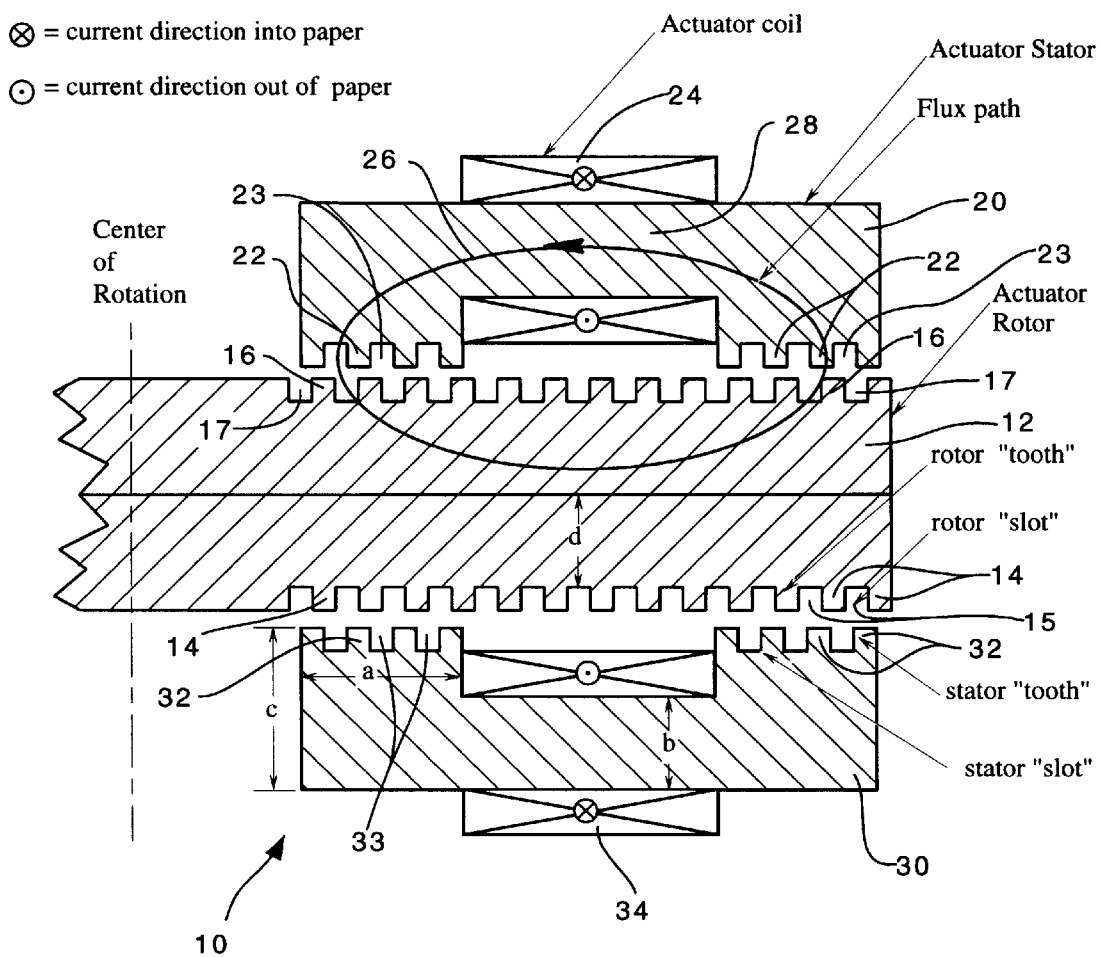
FIG. 1 is a schematic, partial, cross-sectional drawing of a prior art magnetically suspended rotating wheel for an inertial instrument.

FIG. 1 is a cross-sectional schematic diagram of a portion of a prior art electromagnetic control system for the spinning wheel angular momentum generator of a gyroscope. This is exemplary of a magnetic actuator. System 10 includes bilaterally-symmetric circular rotor 12 which is rotated about the center of rotation by a means, not shown. The position of the rotor is controlled by a number of actuators that together comprise the stator. Two such actuators, 20 and 30, are shown. Each actuator 20 and 30 is able to provide normal and tangential forces on the rotor 12. "Normal" forces are defined as those which change the air gap between the rotor 12 and the respective stator actuator. "Tangential" forces are defined as those which move rotor 12 to the left or right in the drawing; in other words, lateral rotor movement.

Actuator 20 has a regular series of alternating teeth 22 and slots 23 along its active surface facing teeth 16 and slots 17 on one face of rotor 12. Actuator 30 is identical, with teeth 32 and slots 33 along its active surface facing teeth 14 and slots 15 on one face of rotor 12. Rotor 12 itself has a regular series of alternating teeth 16 and slots 17 on one face, and teeth 14 and slots 15 on the other face. The spacing of the teeth (called the pitch) is the same on the active surfaces of each of the actuators, and on the rotor faces. The teeth in the rotor 12 and the actuators 20, 30, are offset, to accomplish tangential force. Each of the actuators 20 and 30 is typically shaped as a quadrant of a circle, with its edges defined approximately by two radii and the circumference.

Actuator 20 includes coil 24 wound around the center of the actuator. Current flows through coil 24 in the direction shown to accomplish magnetic flux traveling generally along flux path 26. Since all of the flux flowing through each of the 4 teeth on each side of coil 24 must travel through stator back iron 28, back iron thickness b must be approximately 4 times the tooth width in order to prevent premature limitation of maximum force due to magnetic saturation in the back iron. Similarly, the rotor back iron width d (which is half of the rotor thickness, since the device is symmetric) must be the same as width b. Stator thickness c is greater than thickness b to provide space for the coil 24, 34, which can be wound around the back iron as shown, or around the actuator stator legs above the teeth.

Figure 2A:
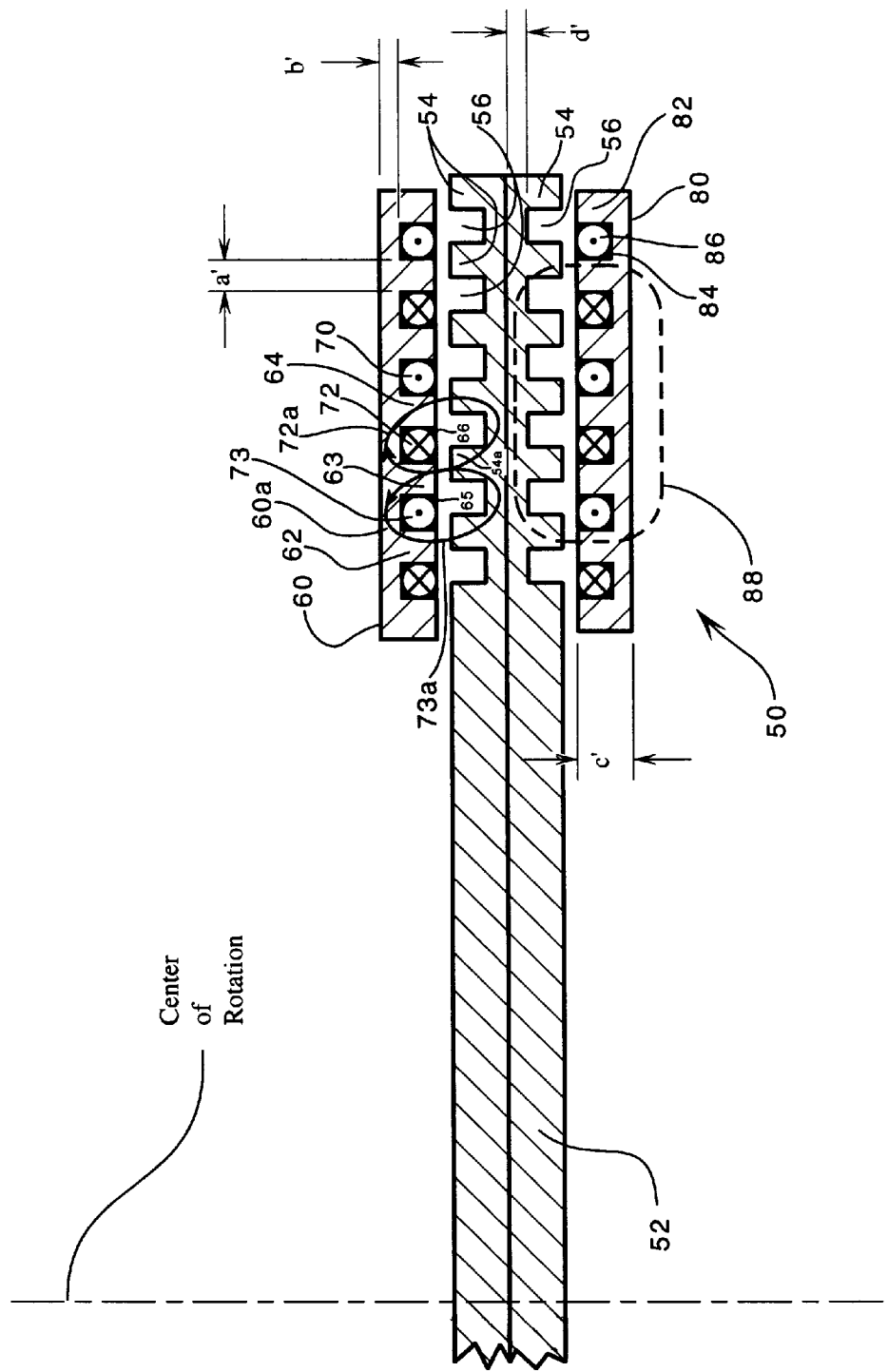
FIG. 2A is a schematic, partial, cross-sectional drawing of a magnetically suspended rotating wheel for an inertial instrument, exemplary of a magnetic actuator according to this invention.

FIG. 2A is a similar view of actuator 50 according to this invention. Actuator 50 provides the same functionality as actuator 20, FIG. 1, but with significant advantages. Actuator 50 includes rotor 52 which comprises the passive member whose position is controlled by the excited member made up of a number of stator sectors such as sectors 60 and 80. The remaining sectors are not shown in this drawing, but are described below.

Actuator 50 accomplishes the same normal and tangential position control of rotor 52, as does the prior art device depicted in FIG. 1. However, the volume of back iron magnetic material in both the rotor and stator is significantly less than that of the prior art device. Such is the case because the conductors of the stator coils are distributed in the slots between the stator teeth. For example, stator sector 60 includes teeth 62 and 63 separated by slot 65, and slot 66 separating tooth 64 from tooth 63. Conductor 73 is placed within slot 65, insulated from stator sector 60. Conductor 72 is similarly placed within slot 66. The excitation current is passed through conductors 73 and 72 in opposite directions as shown. The current passing through conductor 73 thus creates flux 73a having the direction shown. The current passing through conductor 72 creates flux 72a having the opposite direction as shown. As a result, the two fluxes 72a and 73a additively combine in tooth 63, and rotor tooth 54a. However, the fluxes separate in the back iron area of sector 60 (in back of the slots). Since the flux in stator sector back iron 60a is half of that in tooth 63, back iron thickness b' need only be approximately half of the tooth width a'. Likewise, rotor back iron width d' need only be half of tooth width a'. As a result, the thickness of magnetic actuator 50 is substantially less than the thickness of magnetic actuator 10, FIG. 1, while accomplishing the same rotor control force. Since the device materials are the same, it follows that the device mass is similarly reduced. This accomplishes an actuator with a greater force to size, or mass, ratio, and thus an actuator with greater functionality.

Figure 2B:
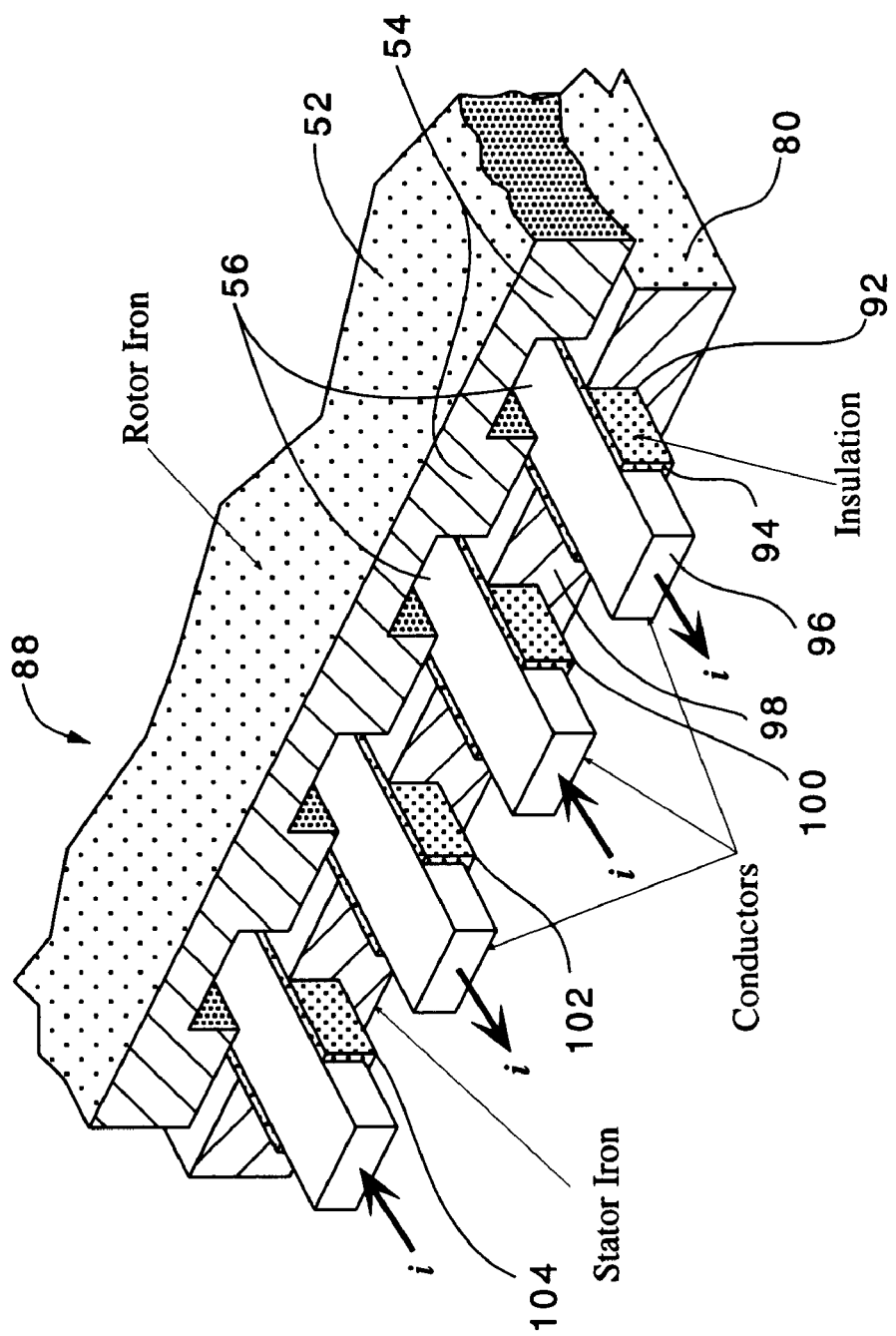
FIG. 2B is an enlarged, detailed schematic diagram of a portion of the magnetic actuator of FIG. 2A.

A portion 88 of stator sector 80 and rotor 52, is shown in detail in FIG. 2B. Magnetic actuator 50 can be fabricated using micro-machining technologies well known in the art, in which primarily planar devices are created by selective deposition and etching of appropriate materials. This technique has the advantage of mass production of large quantities of devices of extremely small size at low unit cost. Devices made by micro-machining technologies are described in a paper entitled "A Fully Integrated Magnetically Actuated Micromachined Relay", pp. 231–234 of the June, 1996, Proceedings of the 1996 Solid State Sensor and Actuator Workshop, incorporated herein by reference. Devices of the type shown in FIG. 2A may be constructed using such techniques to accomplish a rotating disk approximately 1 cm diameter and of the order of 1-several mm thick (or, much smaller, or somewhat larger).

Rotor 52 has teeth 54 and slots 56. Stator section 80 has teeth and slots of the same pitch. Conductors are deposited in the slots, insulated from the slot walls. For example, conductor 96 is deposited in slot 92 on previously-deposited insulation layer 94 which lines the walls of slot 92. Slots 100, 102 and 104 are identically constructed. The only difference is the current direction, as shown by arrows i. The single conductor per slot could alternatively be subdivided into a number of conductors insulated from one another to reduce the required excitation current.

Figure 3:
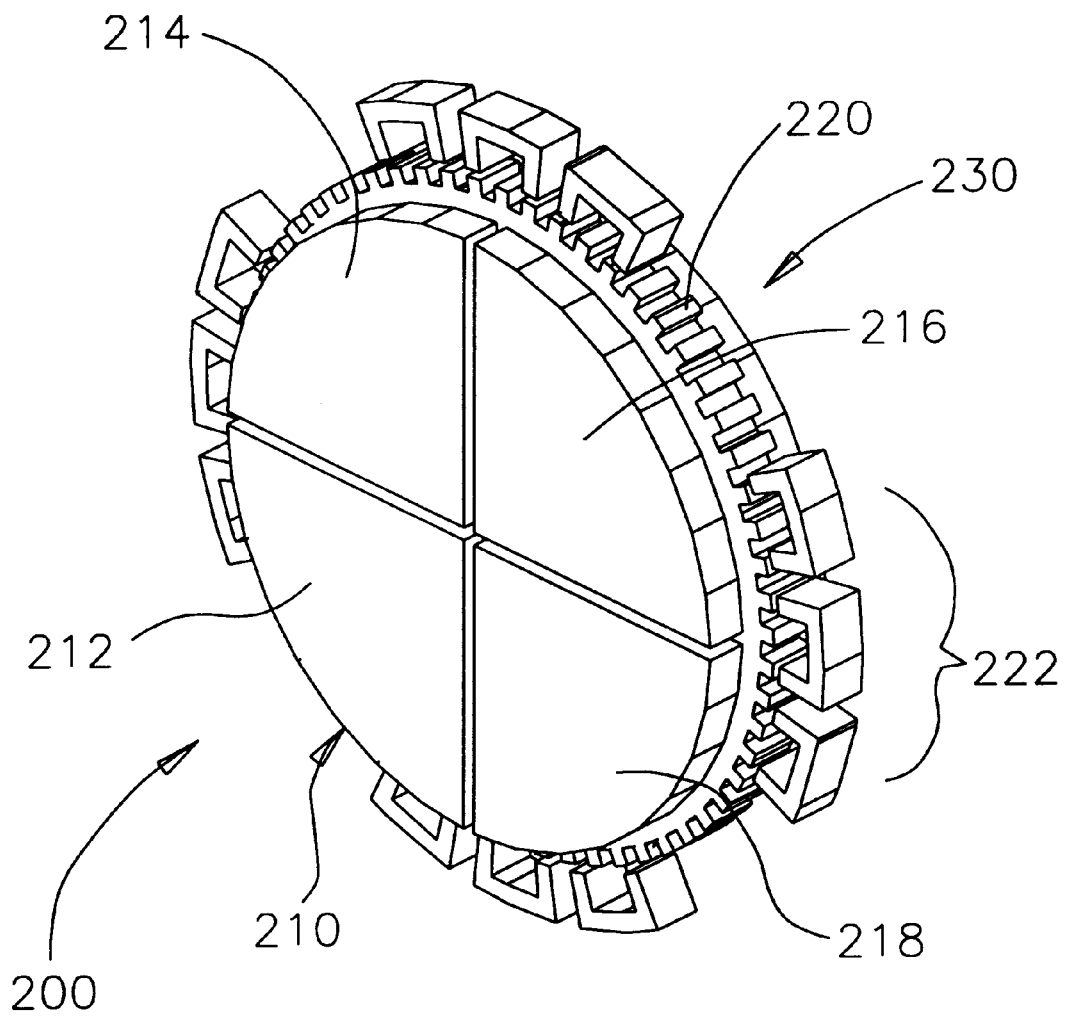
FIG. 3 is a schematic representation of the magnetically suspended rotating wheel of FIG. 2A.
Figure 4:
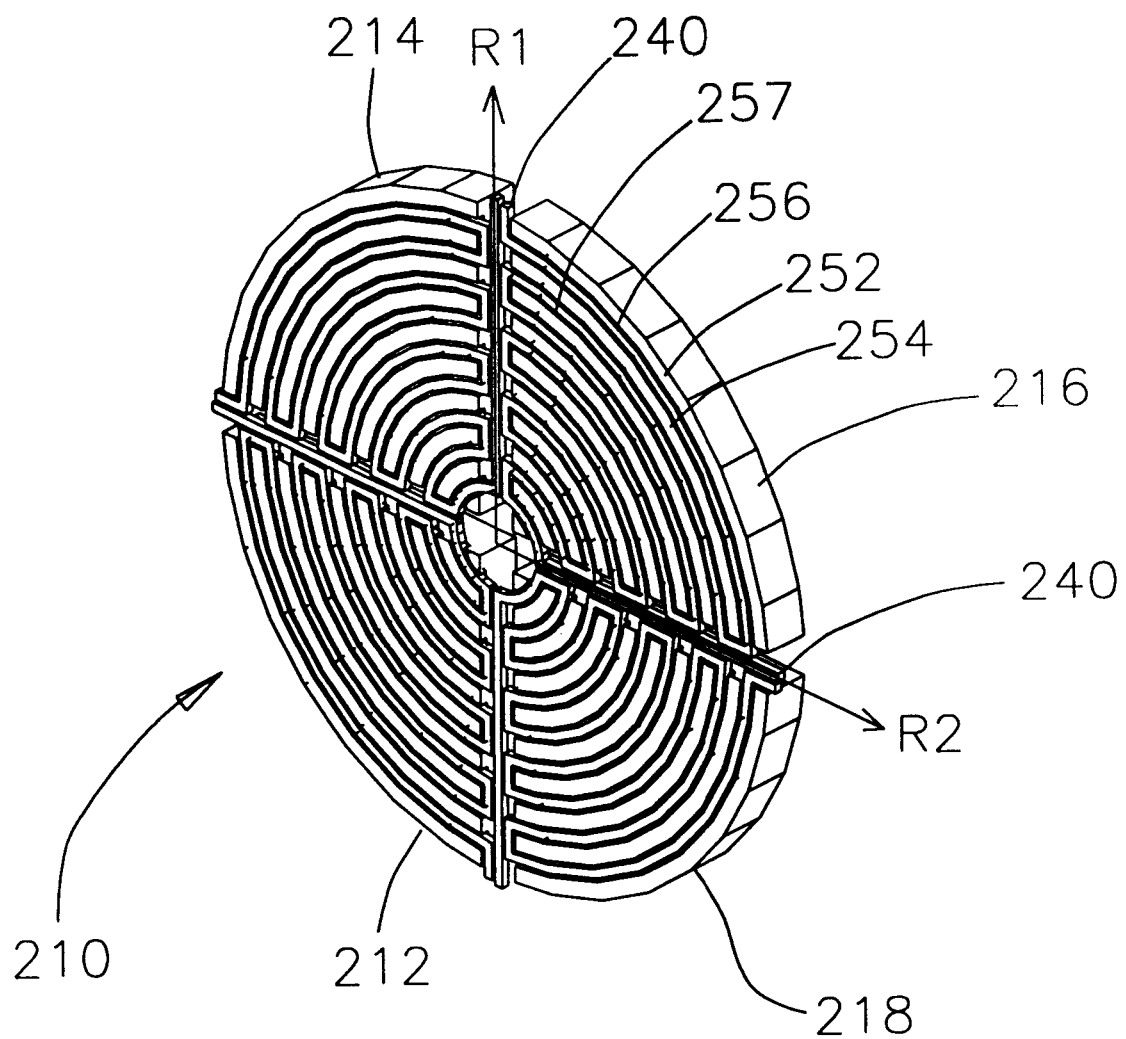
FIG. 4 is a more detailed schematic diagram of a portion of the stator of the device of FIG. 3.
Figure 5:
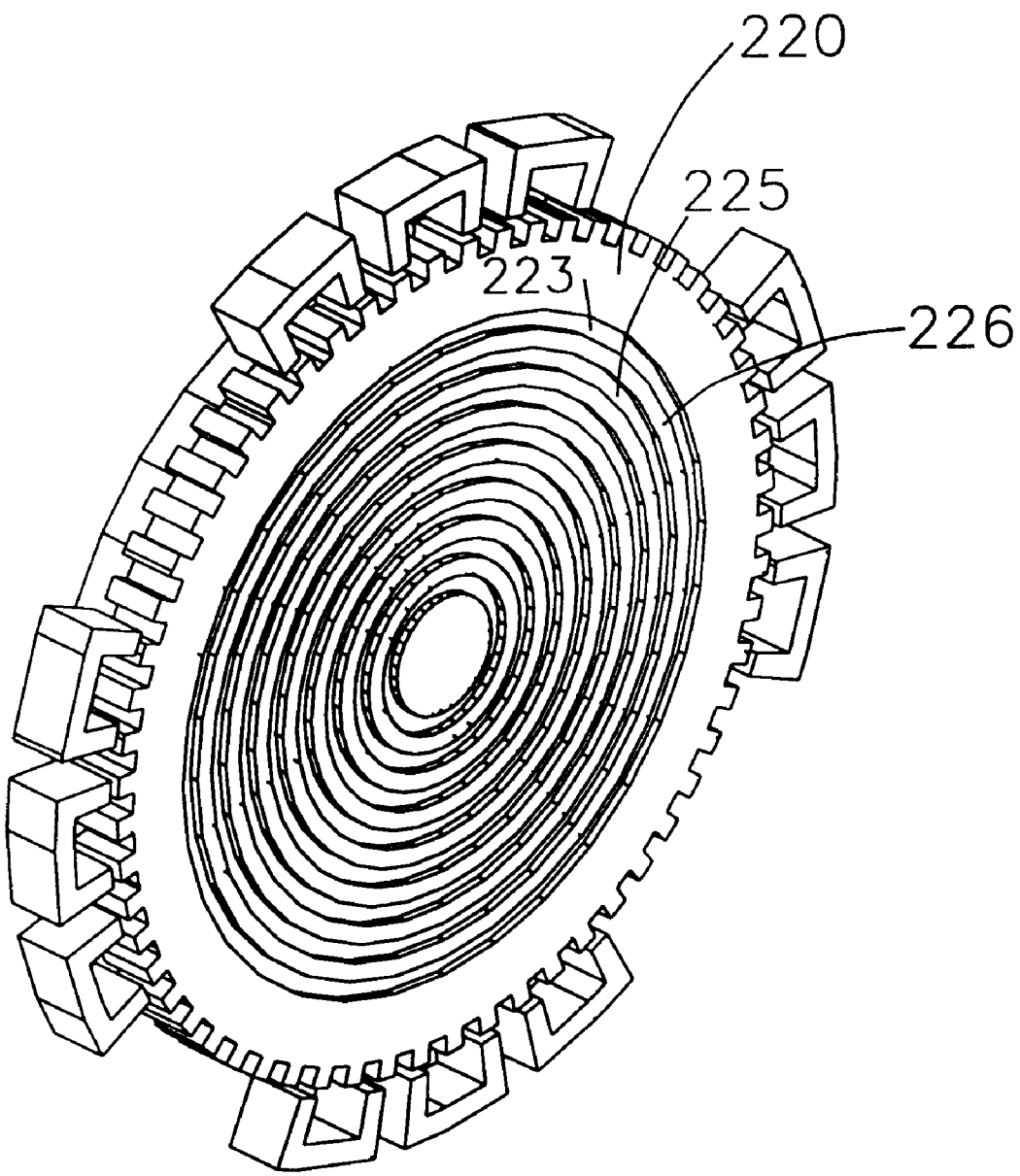
FIG. 5 is a more detailed schematic diagram of the rotor of the device of FIG. 3.

The integration of the actuators described above into a complete magnetic suspension system for a spinning wheel, is shown in FIGS. 3 through 5. Magnetic actuator 200, FIG. 3, includes rotating wheel 220 sandwiched between identical stator portions 210 and 230. Stator portion 210 includes 4 identical quadrant stator sectors 212, 214, 216 and 218. The reverse, inner (active) side of stator portion 210 is shown in FIG. 4. For example, stator sector 216 is a circular quadrant sector defined by radii R 1 and R 2, and the circumference. Sector 216 is configured to define a series of spaced, concentric, arc-shaped, alternating slots and ridges, for example slots 256 and 257 and ridges 254 and 252. A single conductor 240 runs through each of the slots in sector 216 as shown. Since conductor 240 loops through the slots, when current is passed through conductor 240, the current is oppositely directed in adjacent slots, creating the distributed conductors shown in FIGS. 2A and 2B.

One face of rotor 220 is shown in FIG. 5. The other face is identical. The alternating teeth and slots are also created by a regular series of alternating, concentric, circular slots and ridges, for example slots 223 and 225, with ridge 226 therebetween. The rotor 220 may be rotated in a known fashion using excitation members 222, FIG. 3 (electric conductors not shown), and the teeth and slots formed along its rim, shown in FIGS. 3 and 5.

Figure 6:
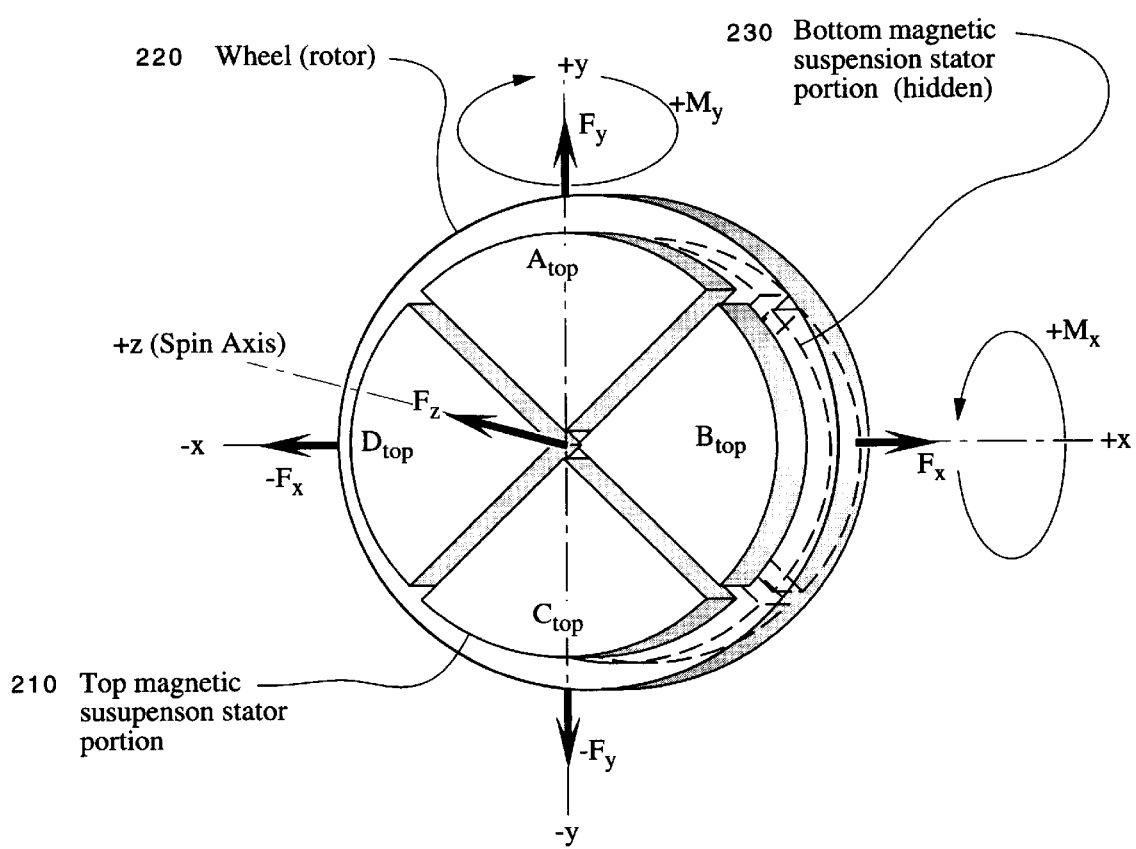
FIG. 6 is a conceptual diagram of the device of FIG. 3, useful in understanding the rotor control.

FIG. 6 and table 1 together describe the control of the rotor in 5 degrees of freedom. The sixth degree is the required rotor rotation which is controlled in a known fashion that does not form part of this invention. Also depicted in FIG. 6 is the axes convention used. A selected quiescent, or bias, current is passed through all of the stator sector conductors, creating essentially identical forces in each stator sector when the rotor is exactly centered. The z (normal to the rotor flat faces) direction attractive force of the actuator sector labeled $B_{top}$ of stator portion 210 is equal to, but opposite in sign, that of the directly opposite actuator sector $B_{bottom}$ (not shown, of stator portion 230) while the x forces are equal and in the same direction (-x direction). The +z direction attractive force of the actuator sector labelled $D_{top}$, is equal to, but opposite in sign, to that of the directly opposite actuator sector $D_{bottom}$, while the x forces are equal and in the same direction (+x direction). Thus, no net force is developed on the rotor. A similar situation applies to the y-axis forces. +x-axis force only, without affecting the other forces and moments, is generated by increasing the current in the actuator conductors of, $D_{top}$ and $D_{bottom}$, by an amount $\Delta i$, and decreasing that in the conductors of $B_{top}$ and $B_{bottom}$ by $\Delta i$. y-axis forces are generated in a similar fashion.

z-axis forces: +z-axis force only, without affecting the other forces and moments, is generated by increasing the current in the conductors of actuator sectors $A_{top}$, $B_{top}$, $C_{top}$ and $D_{top}$, by an amount $\Delta i$, while decreasing the current in the conductors of $A_{bottom}$, $B_{bottom}$, $C_{bottom}$ and $D_{bottom}$, by $\Delta i$; the net x and y-axis forces and moments are unchanged.

Moments about x- and y-axes: Counterclockwise torque on the rotor, $+M_x$, about the x-axis is generated by increasing the current in the conductors of $A_{top}$ and $C_{bottom}$ by $\Delta i$ and decreasing the current in the conductors of $A_{bottom}$ and $C_{top}$ by $\Delta i$; the x, y and z forces are unchanged. Clockwise torque on the rotor, $-M_x$, is generated by decreasing the current in the $A_{top}$ and $C_{bottom}$ conductors by $\Delta i$ and increasing the current in the $A_{bottom}$ and $C_{top}$ conductors by $\Delta i$; the x, y and z forces are again unchanged. Torques about the y-axis are generated similarly.

The control logic is summarized in Table 1. In addition to making independent control of the forces and torques possible, the bias current provides the benefit of linearizing the force vs. control current relationship, which would otherwise be quadratic.

TABLE 1

Magnetic Suspension Control Logic

| Sector | $+F_x$ | $-F_x$ | $+F_y$ | $-F_y$ | $+F_z$ | $-F_z$ | $+M_x$ | $-M_x$ | $+M_y$ | $-M_y$ |
|---|---|---|---|---|---|---|---|---|---|---|
| $A_{top}$ | $+\Delta i$ | $-\Delta i$ | $+\Delta i$ | $-\Delta i$ | $+\Delta i$ | $-\Delta i$ | $+\Delta i$ | $-\Delta i$ | | |
| $B_{top}$ | | | | | $+\Delta i$ | $-\Delta i$ | | | $-\Delta i$ | $+\Delta i$ |
| $C_{top}$ | | | $-\Delta i$ | $+\Delta i$ | $+\Delta i$ | $-\Delta i$ | $-\Delta i$ | $+\Delta i$ | | |
| $D_{top}$ | $-\Delta i$ | $+\Delta i$ | | | $+\Delta i$ | $-\Delta i$ | | | $+\Delta i$ | $-\Delta i$ |
| $A_{bottom}$ | | | $+\Delta i$ | $-\Delta i$ | $-\Delta i$ | $+\Delta i$ | $-\Delta i$ | $+\Delta i$ | | |
| $B_{bottom}$ | $+\Delta i$ | $-\Delta i$ | | | $-\Delta i$ | $+\Delta i$ | | | $+\Delta i$ | $-\Delta i$ |
| $C_{bottom}$ | | | $-\Delta i$ | $+\Delta i$ | $-\Delta i$ | $+\Delta i$ | $+\Delta i$ | $-\Delta i$ | | |
| $D_{bottom}$ | $-\Delta i$ | $+\Delta i$ | | | $-\Delta i$ | $+\Delta i$ | | | $-\Delta i$ | $+\Delta i$ |

Figure 7:
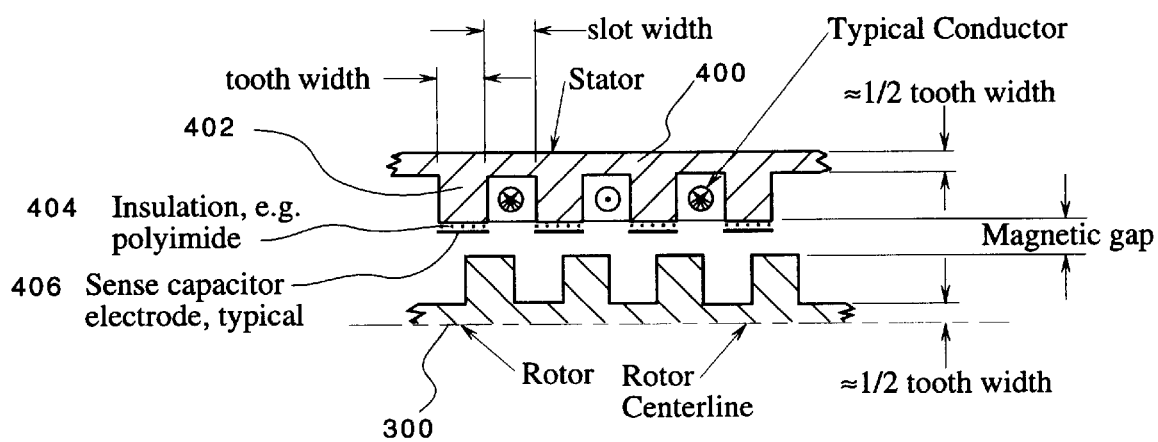
FIG. 7 is an enlarged, schematic, partial, cross-sectional drawing of a magnetic actuator according to this invention with an embodiment of position sensing devices for use in position control.

FIG. 7 depicts one possibility for sensing the relative position of rotor 300 and stator 400, for an active suspension control system useful in this invention. Capacitor electrodes such as electrode 406 can be added to the teeth of stator 400, insulated from the material of the stator. The variable capacitance sensing accomplished using capacitors is independent of the force application in the magnetic actuator, making the active control system easier to implement. The co-location of the force application devices and the sensing devices also simplifies the control system design.

There are several alternative position sensing and control techniques that could be implemented in this invention. Non-limiting examples include: continuously sensing the inductance of the actuator members (typically the stator so that the rotor can remain passive) while they are being used to generate force, or time-sharing the actuators so that they are used for forcing for a part of the time, and sensing for the balance of the time; and sharing the space allocated to the sensor and actuator stator, providing a portion for forcing and using the balance for sensing. This approach, and the time-sharing approach, would decrease the maximum force capability of the actuator, but would reduce the effect of the interaction of magnetic material non-linearities and forcing current variations on accuracy of position sensing.

The stators themselves can be effectively used for sensing the position of the rotor because their self-inductance changes with both tangential and normal motion; an output voltage proportional to the change in inductance, and thus in position, results when the actuators are used in a suitable bridge circuit or an equivalent design. The sensing sensitivity will be maximum when the geometry is selected for maximum developed force, because both position sensing sensitivity and the developed force are directly proportional to the rate of change of inductance with position.

The magnetic actuator and position control system of this invention can be used in situations that can benefit from precise control of the relative positions of members, at least one of which is movable. The designs, which lend themselves to planar fabrication technologies, may be implemented in electronic devices with electromechanical structures. One example would be a data storage disk drive. The read/write head of such drives is desirably very finely controlled. Because of the nonrepeatable runout of the ball bearings, combined with the limited control bandwidth of the head position controller, typically used to support the disk of such drives, the heads cannot be precisely positioned over the track containing the recorded information. This limits track density, and thus the disk storage capacity, increasing the cost per stored bit.

An actuator system of this invention, situated close to the read/write head, could be used to provide high bandwidth precision control of the head position over a small position range, allowing the data tracks to be more narrow, and located closer together. The read/write heads widely used in the field are of thin film construction, and are fabricated using the same photolithographic electrodeposition technologies that may be used to fabricate the magnetic actuators of this invention. Such could allow the positioning and control afforded by this invention to be built into the disk read/write heads using the current head fabrication techniques.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A position control system for a magnetically suspended rotor which is rotated about a rotation axis, the rotor having external teeth separated by slots, comprising:

a plurality of separate essentially coplanar position control stator sectors opposite and spaced from the rotor, each stator sector having external slots facing the external teeth on the rotor, to define a series of external teeth separated by slots;

a distributed-conductor electric coil for each of the stator sectors, each coil including at least one conductor in each slot of the respective stator sector; and means for separately energizing each electric coil to control the normal and tangential and tilt position of the rotor relative to the stator.

2. The rotor position control system of claim 1 in which the rotor is a wheel with essentially flat axial end faces, and the stator sectors are arranged proximate each face of the rotor.

3. The rotor position control system of claim 2 in which the stator sectors proximate each face of the rotor define a circular stator portion, and each sector of each stator portion is defined by two radii of the stator portion, and the stator portion circumference.

4. The rotor position control system of claim 3 in which the slots are concentric spaced slots extending between the two radii which partially define the stator portion.

5. The rotor position control system of claim 4 in which the electric coil for each stator portion includes a continuous conductor running through each of the concentric slots, and partially along each radius.

6. An electromagnetic actuator for accomplishing relative movement and position control between an excited stator and a passive rotor, comprising:

an electromagnetic stator having a number of separate, essentially coplanar, sectors, each said sector configured to define along its active surface a series of elongated teeth separated by elongated slots, with a back iron area behind the teeth and slots to complete the flux paths within the stator;

at least one electrical conductor disposed within and along the length of said slots of each said sector of said stator, to accomplish at least one separate distributed conductor electric coil for each said sector;

means for separately energizing said at least one coil of each said sector such that current flows in opposite directions in said conductors in adjacent slots, to create oppositely-directed flux paths which additively combine in the tooth between said adjacent slots, to accomplish a high level of magnetic force with a lower back iron thickness;

a magnetic, passive rotor, proximate, and spaced from, said stator active surface, said rotor completing the flux paths, said rotor having a series of elongated teeth opposite said teeth of said stator, to allow the development of tangential electromagnetic control forces between said stator and said rotor; and means for controlling the current flow separately to said at least one coil of each said sector, to control both the normal and tangential position, and tilt angle, of said rotor relative to said stator.

7. The actuator of claim 6 in which said stator controls the position of said rotating wheel, relative the said stator, in five degrees of freedom.

8. The electromagnetic actuator of claim 6 in which the teeth on said rotor are essentially parallel to, and offset from, the teeth on said stator, and in which the tooth pitch of said stator and said rotor are the same.

9. The electromagnetic actuator of claim 6 in which said rotor is a rotating wheel with opposite axial end faces, and said stator is juxtaposed opposite at least one face of said rotating wheel.

10. The actuator of claim 9 in which the stator is distributed opposite both faces of the rotating wheel.

11. The actuator of claim 10 in which the stator includes a plurality of separate stator sectors opposite each face of the rotating wheel, each sector including its own distributed conductor electric coil, and in which said means for controlling the current flow includes means for separately energizing each sector, to control the normal and tangential position, and the tilt angle of, the passive member relative to the excited member.

12. The actuator of claim 11 in which the stator includes eight stator sectors, four opposite each face of the rotating wheel.

13. The actuator of claim 12 in which each of the four stator sectors opposite a face of the rotating wheel are identical.

14. The actuator of claim 11 in which the stator sectors are generally shaped as quadrants of a circle defined by two radii and the circumference.

15. The actuator of claim 14 in which the stator slots are spaced concentric slots extending between the radii.

16. The actuator of claim 15 in which the distributed conductor electric coil includes a continuous conductor running through each of the stator slots, and partially along each radius defining the stator sector.

* * * * *